United States Patent [19]

Anthony et al.

[11] Patent Number: 5,282,706
[45] Date of Patent: Feb. 1, 1994

[54] RETRACTABLE TIE-DOWN ASSEMBLY

[75] Inventors: James T. Anthony, Noblesville; Niels Dybro, Carmel, both of Ind.

[73] Assignee: Indiana Mills & Manufacturing, Inc., Westfield, Ind.

[21] Appl. No.: 25,148

[22] Filed: Mar. 2, 1993

Related U.S. Application Data

[63] Continuation-in-part of Ser. No. 950,909, Sep. 24, 1992, abandoned.

[51] Int. Cl.⁵ .......................... B60P 7/06; B66D 1/04
[52] U.S. Cl. ...................... 410/100; 410/97; 254/218; 254/364; 24/68 CD
[58] Field of Search ............. 410/85, 96, 97, 98, 410/99, 100, 102, 103, 106, 108, 109, 116; 254/217, 218, 364, 369; 24/68 CD, 71.2

[56] References Cited

U.S. PATENT DOCUMENTS

| | | | |
|---|---|---|---|
| 772,157 | 10/1904 | Koehler | 410/103 X |
| 1,425,850 | 9/1922 | Gerrard et al. | 254/218 X |
| 2,946,563 | 7/1960 | Eaton | 410/103 X |
| 3,033,488 | 5/1962 | Weber | 254/364 X |
| 4,227,286 | 10/1980 | Holmberg | 410/103 X |
| 4,511,123 | 4/1985 | Ostrobod | 254/364 |
| 4,842,458 | 6/1989 | Carpenter | 410/103 X |
| 4,884,928 | 12/1989 | Nachtigall et al. | 410/100 X |
| 4,900,203 | 2/1990 | Pope | 410/100 X |
| 5,103,536 | 4/1992 | Kamper | 24/68 CD |

FOREIGN PATENT DOCUMENTS

| | | | |
|---|---|---|---|
| 5409 | 12/1931 | Australia | 254/218 |
| 246210 | 11/1987 | European Pat. Off. | 410/100 |

*Primary Examiner*—David A. Bucci
*Assistant Examiner*—Stephen T. Gordon
*Attorney, Agent, or Firm*—Woodard, Emhardt, Naughton, Moriarty & McNett

[57] ABSTRACT

A retractable tie-down assembly that enables a transportable item to be secured on a trailer. The retractable tie-down assembly is assembled about a frame that is permanently attached to the trailer. Webbing or other strap material has one end which is attached to a spool that is rotatably mounted to the frame. The spool includes a pair of side walls which are formed in the shape of ratchet wheels. A handle is movably mounted on the frame and includes a pawl that is engageable with the ratchet wheels and capable of rotating the ratchet wheels and spool in its retracting direction to take up webbing onto the spool and tighten the same. The retractable tie-down assembly also includes a lock that is capable of locking the spool against rotation in its pay out direction.

17 Claims, 6 Drawing Sheets

RETRACTABLE TIE-DOWN ASSEMBLY

CROSS REFERENCE TO RELATED APPLICATION

This application is a continuation-in-part of U.S. patent application Ser. No. 07/950,909, filed Sep. 24, 1992 and now abandoned and entitled RETRACTABLE TIE-DOWN ASSEMBLY.

BACKGROUND OF THE INVENTION

The present invention relates generally to tie-down assemblies that enable a transportable item to be secured on a trailer. In particular, the present invention relates to a retractable tie-down assembly for use in securing the transom of a boat to a trailer.

It is well known that in order to transport a boat on a trailer from one location to another safely, the boat must be secured to the trailer with a plurality of tie-down straps. The number of tie-down straps required generally depends upon the size and the type of boat to be hauled by the trailer. In the case of a conventional speedboat, there is usually required two transom tie-down straps, two bow tie-down straps and a single gunwale tie-down which usually extends completely over the width of the boat. While it is clear that the various tie-downs must be sufficiently tight to hold the boat on the trailer, over-tightening of the tie-down assemblies can cause damage to a boat because the excessive force of the tie-down places a relatively high localized stress on various parts of the boat.

In prior art tie-down assemblies, each tie-down strap usually has a hook at each end and some means for adjusting the length of the strap that is disposed between the two ends. In the case of the transom and bow tie-downs, the hook at one end of the tie-down strap is hooked into an eyebolt on the trailer while the hook at the other end of the tie-down strap is hooked into an eyebolt protruding from either the bow or the transom of the speedboat. The means for adjusting is often a buckle tightening device disposed between the ends of the strap. After the ends of the strap are secured to the boat and trailer, the buckle is turned over the center of the strap to further tighten the tie-down strap by a predetermined amount, which depends on the size of the buckle. Because the buckle always takes out a predetermined amount of slack from the strap, the tie-down strap will either remain insufficiently tight after the buckle is thrown or overtight which can cause damage to the boat. Another drawback of prior art tie-down assembly straps is the fact that the straps must be stored while the boat is in use. Of course the result being that one or more of the tie-down straps could be misplaced or otherwise lost while the boat is off the trailer and in use.

What is needed is a tie-down assembly which remains fastened to the trailer at all times and which has greater adjustability for tightening the strap than in prior art devices in order to prevent damage to the boat being carried by the trailer.

SUMMARY OF THE INVENTION

In order to overcome the drawbacks of the prior art tie-down assemblies discussed above, the present invention comprises a self-retracting tie-down assembly which is permanently attached to the trailer. The tie-down assembly includes a frame permanently attached to the trailer and having a pair of spaced apart upstanding side walls. A spool is rotatably mounted to the frame. The spool has an axle and end walls at least one of which is configured as a ratchet wheel. A webbing or strap has one end attached to the spool and is wrapable thereon. The spool is capable of rotating in a pay out direction to release webbing from the spool or in a retracting direction to wrap the webbing back onto the spool. A spring is attached to the frame and spool and normally urges the spool to rotate in its retracting direction wherein a portion of the webbing is wrapped onto the spool. The tie-down assembly also includes a locking means which is mounted to the frame for locking the spool against rotation in the pay out direction. The locking means is movable between a locked position and a released position. In order to tighten the webbing, the tie-down assembly includes a means for manually ratcheting the spool to rotate in its retracting direction so that the user can easily vary the tightness of the webbing by the number of ratcheting repetitions used to tighten the web. The ratchet means includes a handle movably mounted to the frame. In the preferred embodiment, a spring connected between the locking means and the manual ratcheting means urges the locking means into locking engagement with the spool. In an alternate embodiment, a spring connected between the locking means and the frame urges the locking means into a locking engagement with the spool.

One object of the present invention is to provide a retractable tie-down assembly which has the ability to be easily tightened but not overtightened.

Another object of the present invention is to provide a retractable tie-down assembly that remains fixed to the trailer when the tie-downs are not in use.

Still another object of the present invention is to provide an improved tie-down assembly for trailers.

Other objects and advantages of the present invention will become apparent from the following drawings and description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
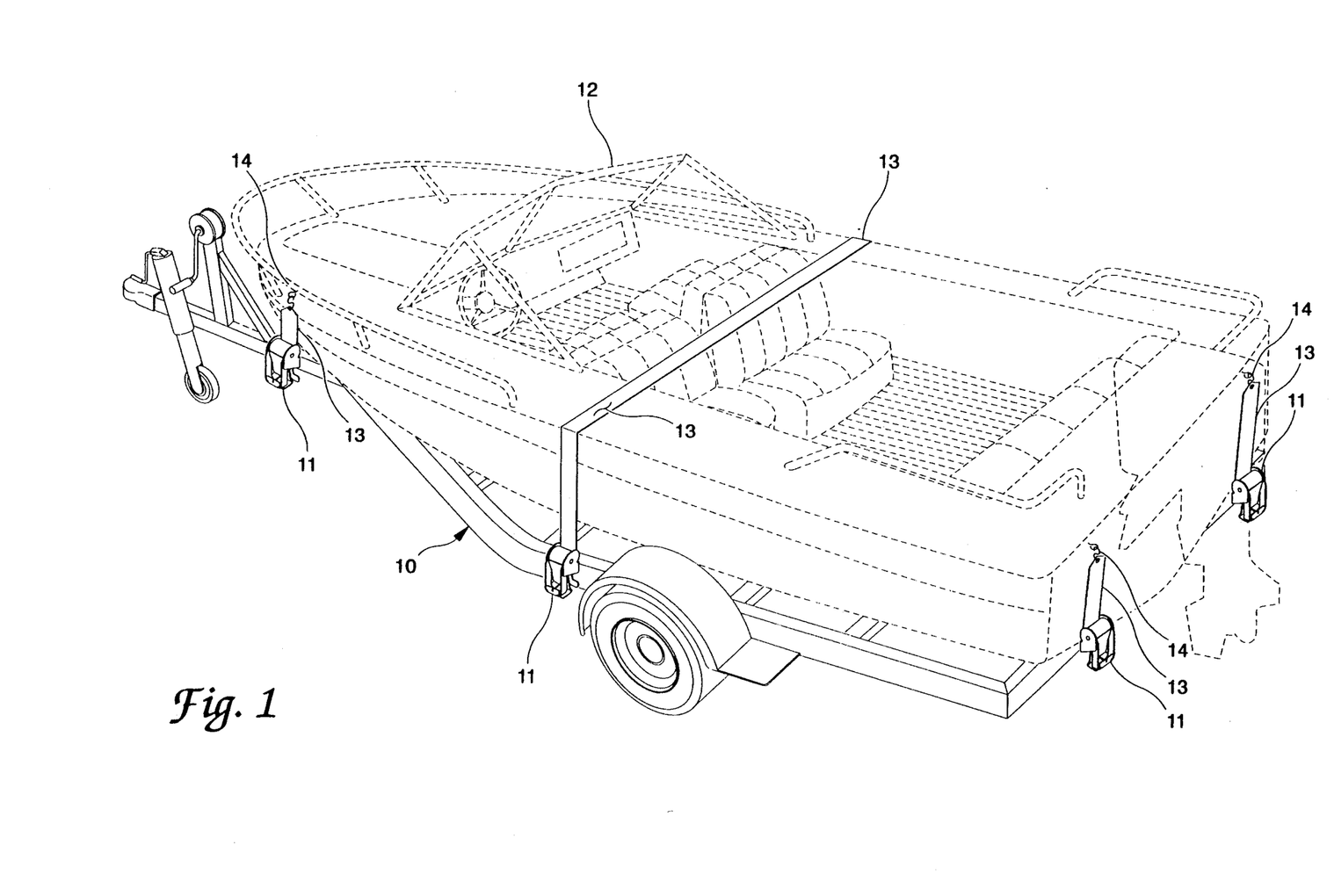
FIG. 1 is a perspective view of a combination trailer and plurality of retractable tie-down assemblies according to one alternate embodiment of the present invention.

Referring now to FIG. 1, there is shown a trailer 10 for hauling an ordinary speedboat 12. Trailer 10 includes a plurality of retractable tie-down assemblies 11 attached thereto at various locations around the periphery of the trailer. Each retractable tie-down assembly 11 includes a spool (to be described infra) which holds an extended length of webbing or strap material 13. One end of webbing 13 is attached to the spool of the tie-down assembly 11 while the other end includes a hook 14 or some other suitable means of attachment or coupling. Boat 12 includes several eyebolts in its transom portion and near its bow that enable the hooks 14 of each tie-down assembly to be secured to the boat. Each retractable tie-down assembly 11 includes a ratcheting handle (to be described infra) that enables the webbing 13 to be tightened as desired to secure boat 12 to trailer 10. When disconnected from the boat 12, webbing 13 is automatically retracted onto the spool of the retractable tie-down assembly 11.

Figure 2:
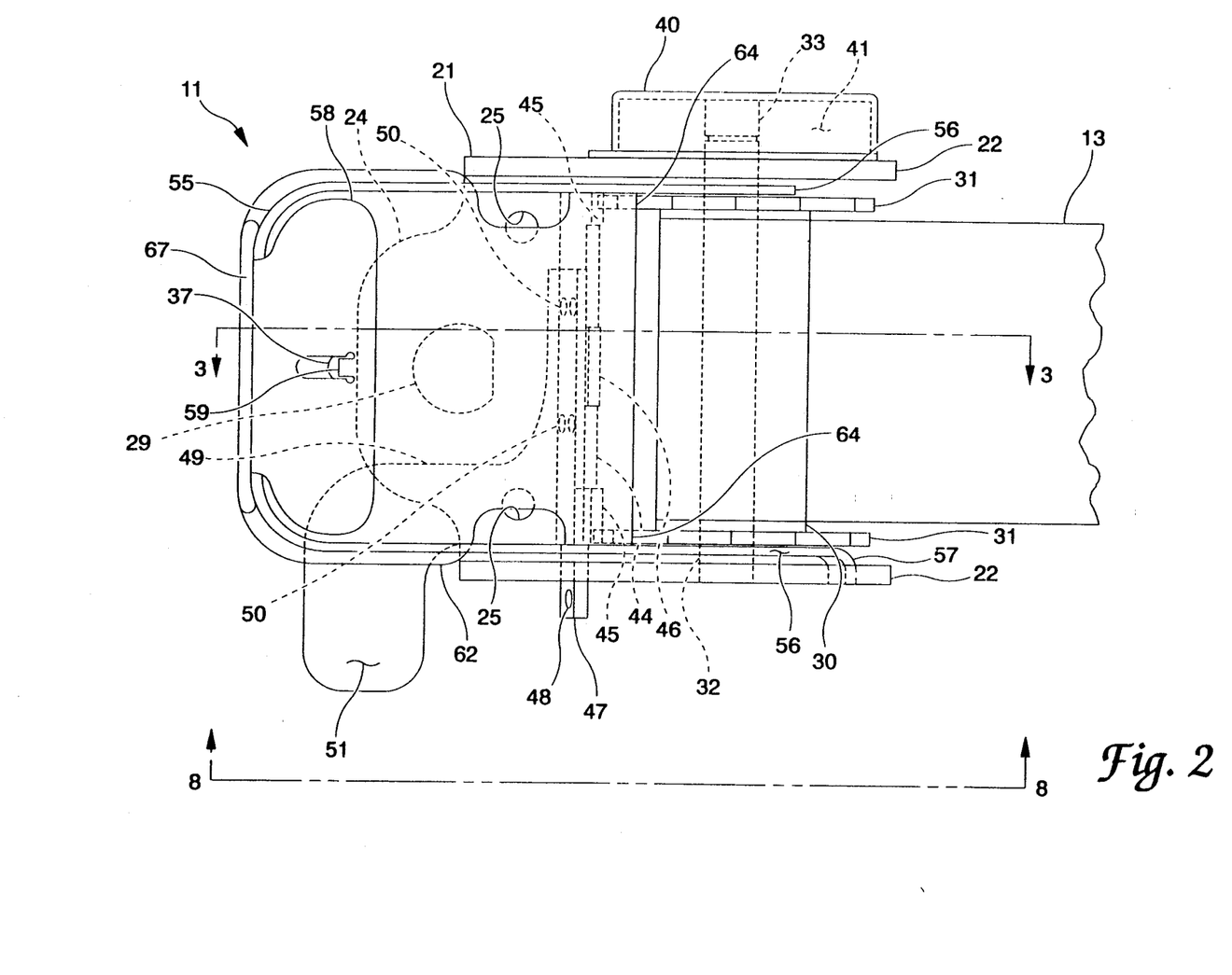
FIG. 2 is a front elevational view of a retractable tie-down assembly according to another embodiment of the present invention.
Figure 3:
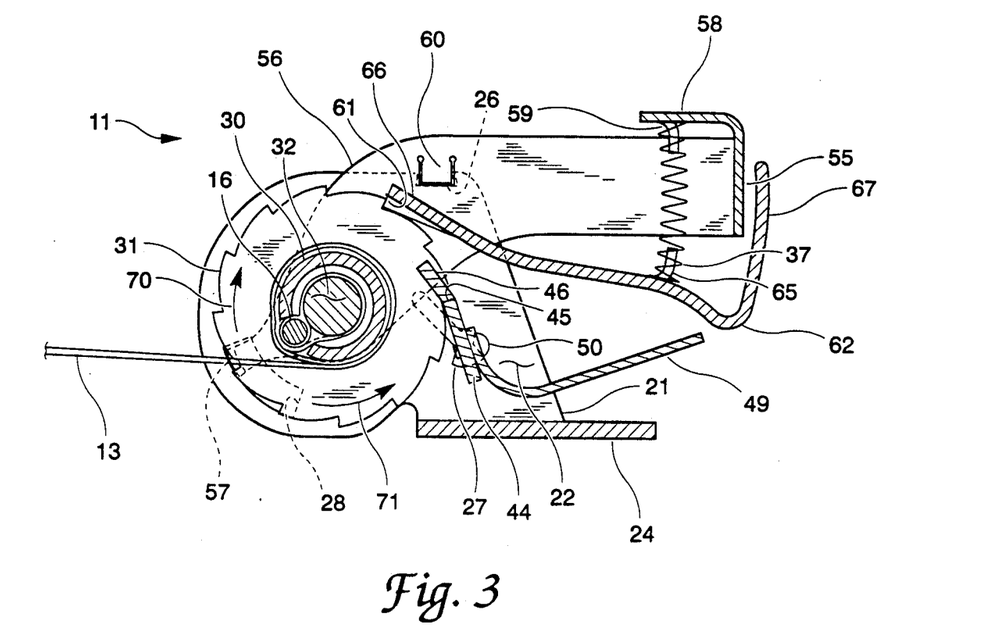
FIG. 3 is a side sectional view of the retractable tie-down assembly of FIG. 2 viewed along section lines 3—3.

Referring now to FIGS. 2 and 3, an alternate embodiment of the retractable tie-down assembly 11 is built around a frame 21 that includes a pair of upstanding side walls 22 interconnected by a base wall 24. As expected, most of the components of the tie-down assembly 11 are preferably made from heavy gauge hardened steel, or other suitable materials which are well known in the art. Base wall 24 is provided with a bore 29 which enables frame 21 to be bolted to a trailer or other like vehicle. Holes (bores) 25 are for attachment of a boot (cover) attachment. An axle 32 is rotatably mounted between upstanding side walls 22. A cylindrically shaped spool 30 having side walls 31, which are shaped as ratchet wheels, are attached to and rotate with axle 32. One end of webbing 13 is attached to spool 30 via rod 16 in the slot arrangement illustrated in FIG. 3. Spool 30 is capable of rotating in a retracting direction 71 in order to wrap webbing 13 onto spool 30, or rotate in pay out direction 70 in order to allow webbing 13 to be unwrapped from spool 30.

Axle 32 includes an axle extension 33 which protrudes beyond one of the upstanding side walls 22, as shown in FIG. 2. A helical spring 41, which is not illustrated, is attached to axle extension 33 and upstanding side wall 22 such that axle 32 and spool 30 are biased to rotate in retracting direction 71. In other words, helical spring 41 tends to cause axle 32 and spool 30 to rotate and retract in direction 71 until substantially all of webbing 13 is wrapped onto spool 30. A plastic covering 40 is attached to upstanding side wall 22 in order to cover helical spring 41 and protect the same from unraveling.

Also mounted between upstanding side walls 22 of frame 21 is a locking means or crossbar 44 that includes protuberances on either end which protrude through and are held by cross-bar cut outs 27 made in both upstanding side walls 22. Cross bar 44 includes a pair of engagement surfaces 45 near both ends of the cross bar which are capable of engaging ratchet wheels 31 to prevent the same from rotating in pay out direction 70. FIG. 3 shows cross bar 44 in its locked position with engagement surfaces 45 engaged with ratchet wheel 31. An extension member 49 is attached to cross bar 44 via a plurality of rivets 50. Extension member 49 includes a depression plate 51, as best shown in FIG. 2, which enables crossbar 44 to be moved from its locked position as shown in FIG. 3 to its release position as shown for example in FIG. 7. Crossbar 44 also includes a crossbar extension 47 which protrudes beyond one of the upstanding side walls 22, and includes a bore 48 therethrough. A wire spring 80 (FIG. 8) is connected to both cross bar extension 47 via bore 48 and upstanding side wall 22 of frame 21. Wire spring 80 acts to bias crossbar 44 to its locked position as shown in FIG. 3 in order to prevent spool 30 from rotating in pay out direction 70, which prevents webbing 13 from being unwrapped from spool 30. Crossbar 44 also includes a web feeler 46 or tab which rests against the webbing when a sufficient amount of the webbing is wrapped onto spool 30. When the webbing 13 on spool 30 is wrapped sufficiently thick, web feeler 46 prevents crossbar 44 from moving to its locked position.

Figure 8:
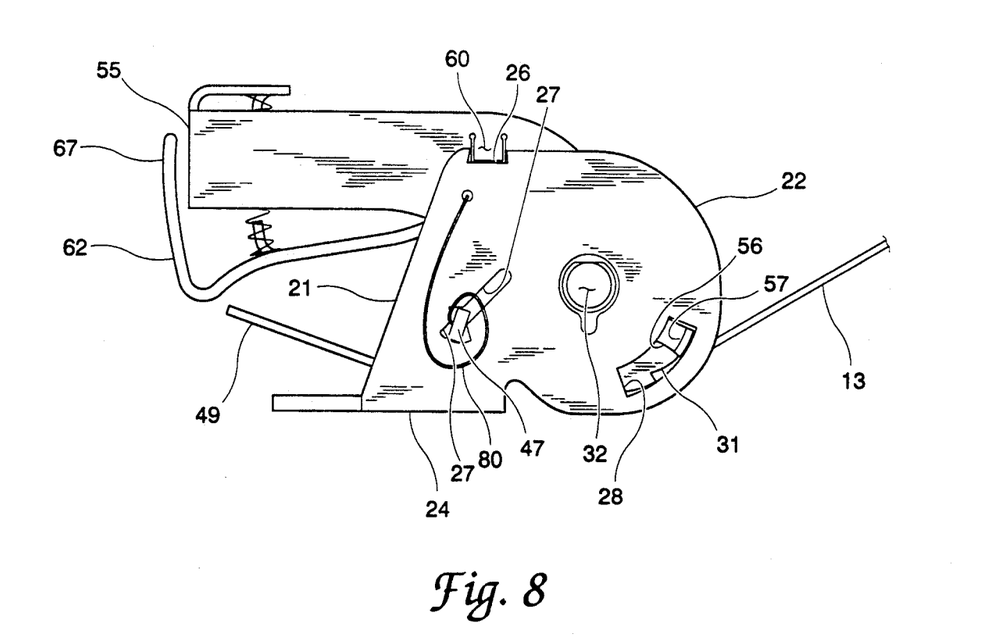
FIG. 8 is a side elevational view of the retractable tie-down assembly shown in FIG. 2 viewed along arrows 8—8.

A handle 55 having a pair of handle extensions 56 is mounted about axle 32 between upstanding side wall 22 of frame 21 and side wall/ratchet wheels 31 of spool 30. In other words, handle extensions 56 include a bore therethrough which receives axle 32 and allows handle 55 to be pivotally moved with respect to frame 21. One of the handle extensions 56 includes a flange 57 formed on one extreme end as best shown in FIG. 8. Flange 57 protrudes outwardly through a handle flange cutout 28 made in upstanding side wall 22 of frame 21. Because flange 57 is confined within handle flange cutout 28, handle 55 is confined in how far it can pivot with respect to frame 21. Handle 55 also includes a flange plate 58 from which a finger spring support 59 protrudes as shown in FIG. 3. Handle 55 also includes a pair of outwardly extending catch flanges 60 on each handle extension 56 that are receivable in catch cutouts 26 made in upstanding side walls 22 of frame 21. The interference fit interplay between catch flange 60 and catch cutout 26 tends to keep handle 55 in its stowed position as shown for example in FIGS. 3 and 8. Catch flange 60 and catch cutout 26 keep handle 55 in its stowed position during vibrations, as for example, those encountered in driving down a road, but is easily releasable from its stowed position with a slight tug.

Figure 4:
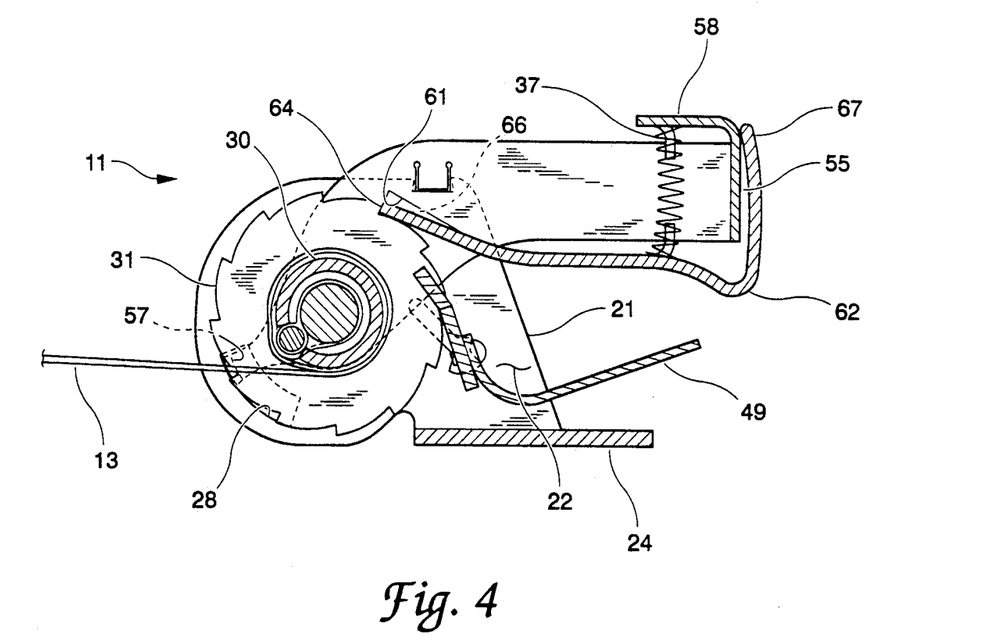
FIG. 4 is a side sectional view identical to FIG. 3 except showing the ratcheting pawl engaged with the ratcheting wheel.

Handle extensions 56 also each include a pawl cutout 61 that receive mutually opposed but oppositely directed male extension portions 66 of pawl 62 which extend outwardly into cutouts 61. Pawl cutout 61 is relatively wedge-shaped so that pawl 62 can be pivoted with respect to handle 55 between its free position as shown in FIG. 3 and its engagement position as shown in FIG. 4. Similar to engagement surfaces 45 of crossbar 44, pawl 62 includes a pair of engagement surfaces 64 which are capable of engaging the teeth of ratchet wheels 31 as shown in FIG. 4. Finally, pawl 62 includes a finger spring support 65 similar to finger spring support 59 of handle 55. A compression spring 37 is mounted between finger spring support 59 and 65 such that pawl 62 is biased to its release position as shown in FIG. 3. Pawl 62 also includes a flange 67 that prevents a person's hand or finger from being pinched between handle 55 and pawl 62 during the ratcheting procedure described infra. In other words, flange 67 extends to cover the gap between pawl 62 and the end of handle 55, thus inhibiting a hand or finger from inadvertently becoming pinched between pawl 62 and handle 55.

When not in use, retractable tie-down assembly 11 keeps substantially all of webbing 13 wrapped onto spool 30 due to the automatic retracting action caused by helical spring 41. In order to unravel webbing 13, one simply depresses depression plate 51 of member 49 (FIGS. 2 and 7) in order to move engagement surfaces 45 of cross bar 44 to their release position so that spool 30 can rotate in its pay out direction 70. While keeping extension member 49 depressed, as in FIG. 7, one simply pulls to unwrap webbing 13 from spool 30 to whatever desired length is needed. The hook 14 at the end of webbing 13 (FIG. 1) is then attached to an eyebolt or other suitable attachment member on the item to be hauled by the trailer, such as boat 12 shown in FIG. 1. The webbing is then released and helical spring 41 causes spool 30 to rotate in its retracting direction 71 in order to take up the slack in webbing 13.

Figure 5:
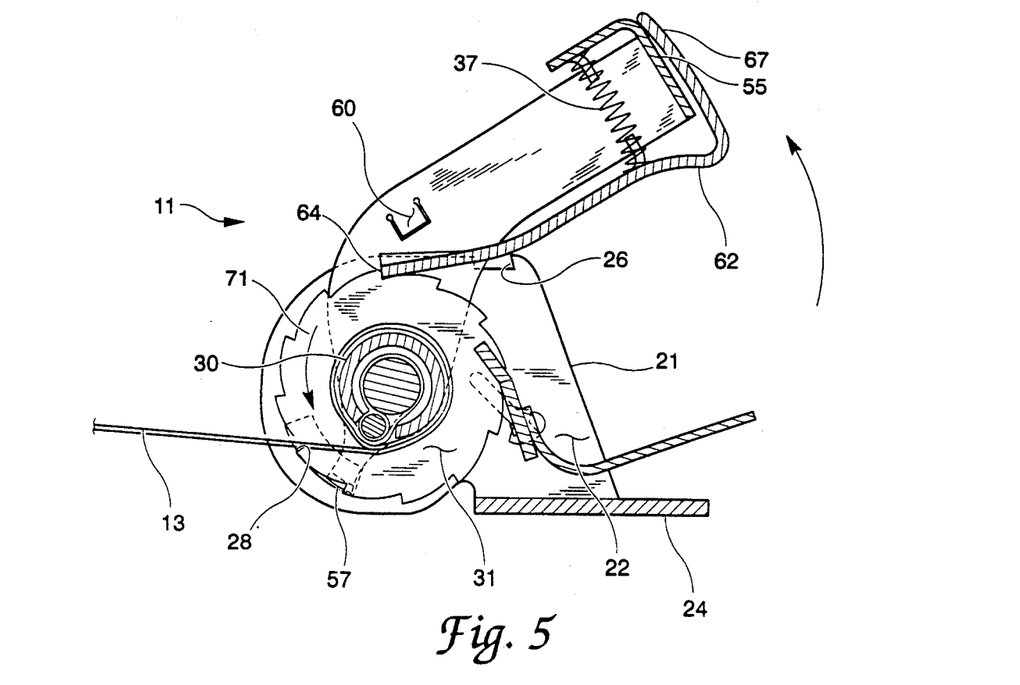
FIG. 5 is a view identical to FIG. 4 except showing the handle after it has moved the ratchet wheel through a partial turn.
Figure 6:
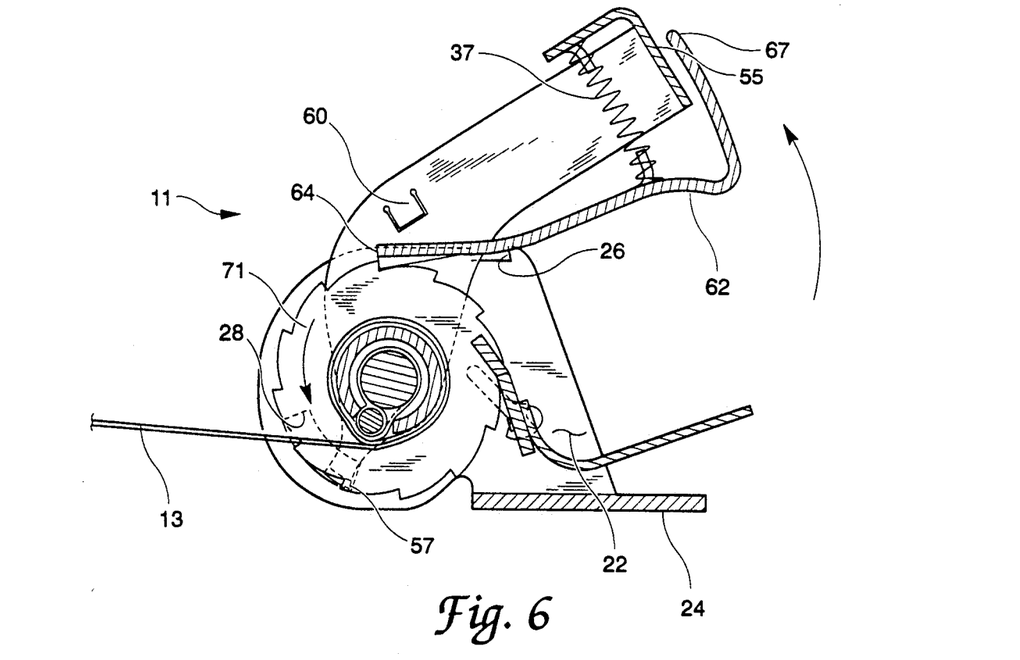
FIG. 6 is a view identical to FIG. 5 except showing the pawl disengaged from the ratchet wheel.

When the slack in webbing 13 is taken up on spool 30, retractable tie-down assembly 11 will be configured as shown in FIG. 3 and will be ready for the ratcheting procedure in order to further tighten webbing 13. The first step in the ratcheting cycle is accomplished by moving pawl 62 from its free position as shown in FIG. 3 to its engagement position shown in FIG. 4, where engagement surfaces 64 are engaged with the teeth of ratchet wheels 31. Next, pawl 62 and handle 55 are pivotally moved with respect to frame 21, as shown in FIG. 5, in order to rotate ratchet wheels 31 and spool 30 through a partial turn. The partial turn is substantially equal to the angular distance between the teeth of the ratchet wheels 31. Recalling, the allowable movement of handle 55 is constrained by the interplay between flange 57 and handle flange cutout 28, shown in FIG. 8. Thus, handle 55 is constrained in its angular movement to an angle which corresponds substantially to the distance between the teeth of ratchet wheels 31. As the ratchet wheels 31 are rotated in retracting direction 71, as shown in FIG. 5, cross bar 44 (FIG. 3) engages the next successive tooth of ratchet wheel 31. Each ratcheting cycle is completed by allowing pawl 62 to again pivot to its release position as shown in FIG. 6. Handle 55 is then moved back to its stowed position in order to begin a new ratcheting cycle. The ratcheting cycle serially illustrated in FIGS. 3-6 is repeated until webbing 13 has achieved its desired tightness.

Figure 7:
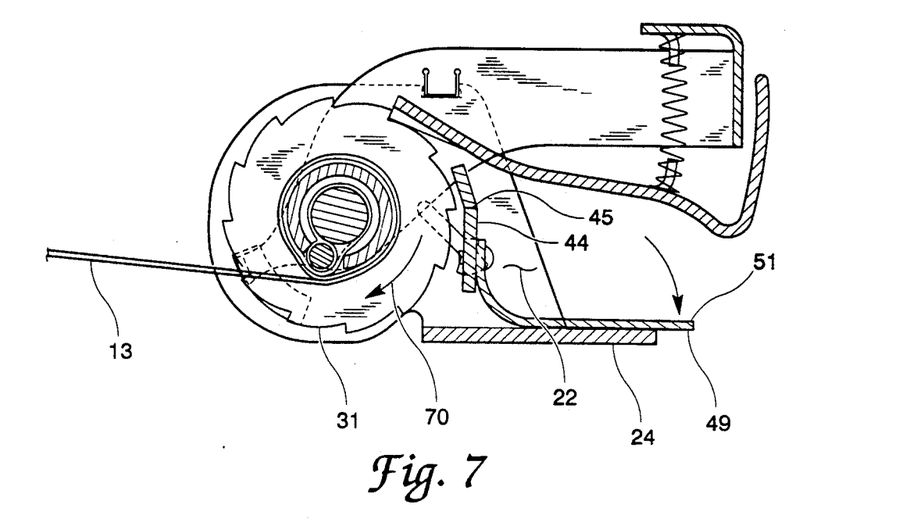
FIG. 7 is a sectioned side elevational view identical to FIG. 3 except showing the locking means in its released position.

The item to be hauled and secured to the trailer, such as boat 12 shown in FIG. 1, is released from the trailer by first depressing depression plate 51 of extension member 49 as shown in FIG. 7 in order to allow spool 30 to rotate in pay out direction 70. Next, sufficient amounts of webbing are then unwrapped from spool 30 in order to unhook hook 14 from the eyebolt attached to the boat (FIG. 1). Webbing 13 is then released and is automatically taken up onto spool 30 due to the retracting action caused by helical spring 41, such that substantially all of webbing 13 is taken up and concealed in retractor tie-down assembly 11 when the webbing is not in use.

Figure 9:
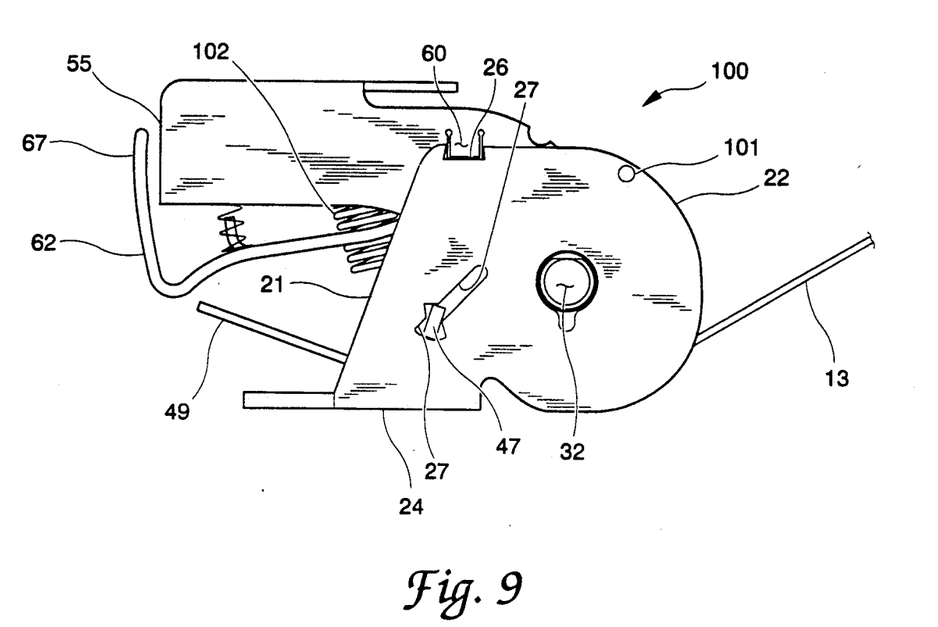
FIG. 9 is the same view as FIG. 8 only showing the preferred embodiment of the retractable tie-down assembly.
Figure 10:
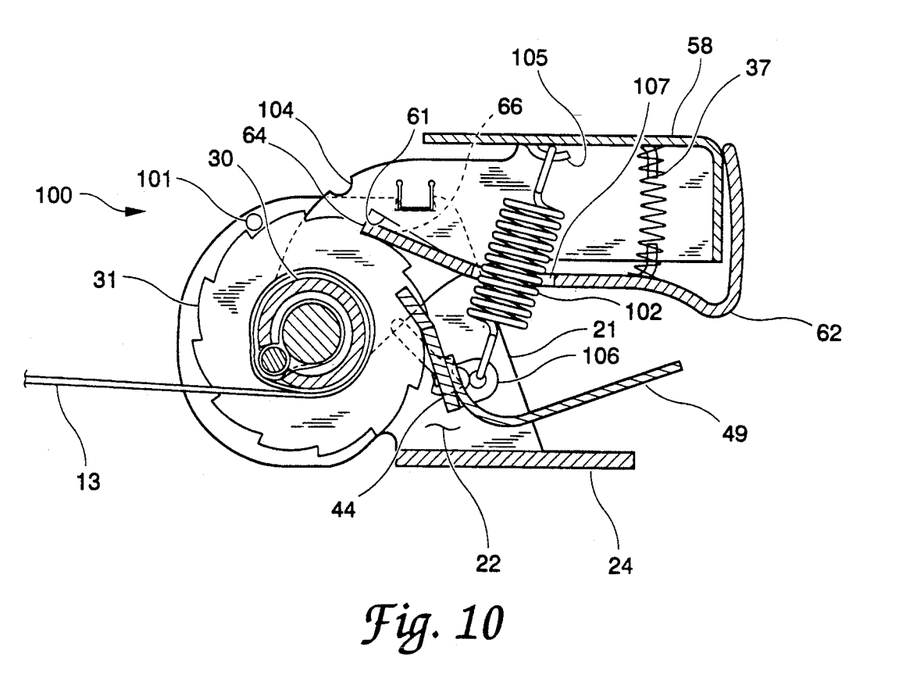
FIG. 10 is a side sectional view of the preferred embodiment of the retractable tie-down assembly shown in FIG. 9.

Referring now more particularly to FIG. 9, there is shown the preferred embodiment of the retractable tie-down assembly 100 which is identical to assembly 11 previously described except a rivet or stop means 101 is used to limit the pivotal motion of handle 55 and pawl 62 in lieu of the flange 57 and cut out 28 combination (FIG. 4) and with the further exception that the cross bar 44 is urged into locking engagement with the spool ratchet by means of a spring 102 (FIG. 9) which extends from cross bar 44 through pawl 62 to handle 55 in lieu of the wire spring 80 utilized in the alternate embodiment shown in FIG. 8. Thus, like numerals are utilized in FIGS. 9 and 10 relative to the same components which have been previously described in the embodiments shown in FIGS. 1–8.

Frame 21 (FIG. 10) includes the pair of upstanding sidewalls 22 connected by the base wall 24. A separate rivet or stop means 101 is fixedly mounted to each sidewall 22 and projects inwardly to contact handle 55 as it is pivotted in counterclockwise direction as viewed in FIG. 10. Each sidewall of handle 55 is provided with a recess 104 to complimentary receive rivets 101 as the handle is pivotted. A conventional extension spring 102 has a top end fixedly secured to a lug 105 depending from and positioned beneath the top wall of the handle with the bottom end of spring 102 fastened to a tab 106 fixedly mounted to and projecting outwardly from cross bar 44. Pawl 62 is provided with a hole 107 through which spring 102 projects enabling the handle 55 and pawl 62 to be pivotted without spring 102 contacting or being bound on pawl 62.

The ratchet spool in the preferred embodiment is rotatably mounted to frame 21 and includes a spring as previously described to urge the spool to retract the web thereon but yieldable to allow the web to be withdrawn or extended from the retractor. The axle mounting the spool to the retractor frame extends through the sidewalls of handle 55 to allow the handle to pivot thereon. Thus, the sidewalls of handle 55 include a pair of apertures through which the axle extends.

Spring 102 provides a spring means which is engaged with the locking means or cross bar 44 and the manual means which includes handle 55 to urge the cross bar into locking engagement with the spool, limiting spool rotation in the pay out direction. Spring 102 is attached to the cross bar and the handle and extends freely through pawl 62.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A retractable tie-down assembly comprising:

a frame having a pair of spaced apart side walls;

a spool rotatably mounted to said frame and having an axle and end walls at least one of said end walls being configured as a ratchet wheel, said spool being capable of rotating in a pay out direction and a retracting direction;

webbing wrapable on said spool and having one end attached to said spool;

a spring attached to said frame and said spool and normally urging said spool to rotate in said retracting direction whereat a portion of said webbing is wrapped thereon;

locking means, mounted to said frame and operable to lock said spool against rotation in said pay out direction; and manual means, including a handle movably mounted to said frame, for manually ratcheting said spool to rotate in said retracting direction; and wherein said locking means is movable out of a locked position in a release direction, said handle is movable between a first position and a second position, and said manual means for manually ratcheting further includes a pawl mounted to said handle and manually movable between an engagement position and a free position, said pawl is capable of engaging said ratchet wheel of said spool when in said engagement position but is biased to said free position; and wherein said spool can be ratcheted in said retracting direction by moving said handle from said first position to said second position when said pawl is in said engagement position.

2. The retractable tie-down assembly of claim 1 wherein said handle is pivotally mounted about an axis defined by said axle of said spool.

3. The retractable tie-down assembly of claim 2 wherein said frame includes a catch means for holding said handle in said first position in the presence of vibrations.

4. The retractable tie-down assembly of claim 3 wherein said locking means includes a crossbar mounted between said side walls of said frame, said crossbar being capable of engaging said ratchet wheel of said spool when in said locked position to prevent said spool from rotation in said pay out direction.

5. The retractable tie-down assembly of claim 1 and further comprising:

second spring means engaged with said locking means and said manual means operable to normally urge said locking means into locking engagement with said spool thereby limiting spool rotation in said pay out direction.

6. The retractable tie-down assembly of claim 5 wherein:

said manual means includes said handle and a pawl pivotally mounted to said frame and a third spring means engaged with said handle and said pawl operable to normally urge said handle and said pawl apart, said second spring means attached to said locking means and said handle and extending from said locking means freely through said pawl to said handle.

7. A combination trailer with tie-down assembly for securing an item to be hauled to the trailer, the combination comprising:

a trailer:

at least one tie-down assembly attached to said trailer for securing an item to be hauled to the trailer, each tie-down assembly comprising:

a frame having a pair of spaced apart side walls:

a spool rotatably mounted to said frame and having an axle and end walls at least one of said end walls being configured as a ratchet wheel, said spool being capable of rotating in a pay out direction and a retracting direction;

webbing wrapable on said spool and having one end attached to said spool;

a spring attached to said frame and said spool and normally urging said spool to rotate in said retracting direction whereat a portion of said webbing is wrapped thereon;

locking means, mounted to said frame and movable between a locked position and a release position, for locking said spool against rotation is said pay out direction, said locking means being biased to said locked position but including an extension member for manual movement to said release position; and, means, including a handle movably mounted to said frame, for manually ratcheting said spool to rotate in said retracting direction; and wherein said handle is movable between a first position and a second position, and said means for manually ratcheting further includes a pawl mounted to said handle and manually movable between an engagement position and a free position, said pawl is capable of engaging said ratchet wheel of said spool when in said engagement position but is biased to said free position; and wherein said spool can be ratcheted in said retracting direction by moving said handle from said first position to said second position when said pawl is in said engagement position.

8. The combination of claim 7 wherein said handle is pivotally mounted about an axis defined by said axle of said spool.

9. The combination of claim 8 wherein said locking means includes a crossbar mounted between said side walls of said frame, said crossbar being capable of engaging said ratchet wheel of said spool when in said locked position to prevent said spool from rotation in said pay out direction.

10. The combination of claim 7 and further comprising:

second spring means engaged with said locking means and said handle and operable to normally urge said locking means into locking engagement with said spool thereby limiting spool rotation in said pay out direction.

11. A retractable tie-down assembly comprising:

a frame having a pair of spaced apart side walls;

a spool rotatably mounted to said frame and having an axle and end walls at least one of said end walls being configured as a ratchet wheel, said spool being capable of rotating in a pay out direction and a retracting direction;

webbing wrapable on said spool and having one end attached to said spool;

a spring attached to said frame and said spool and normally urging said spool to rotate in said retracting direction whereat a portion of said webbing is wrapped thereon;

locking means, mounted to said frame and movable between a locked position and a release position, for locking said spool against rotation in said pay out direction, said locking means being biased to said locked position but including an extension member for manual movement to said release position; and means, including a handle movably mounted to said frame, for manually ratcheting said spool to rotate in said retracting direction; and wherein said handle is movable between a first position and a second position, and said means for manually ratcheting further includes a pawl mounted to said handle and manually movable between an engagement position and a free position, said pawl being capable of engaging said ratchet wheel of said spool when in said engagement position but being biased to said free position; and wherein said spool can be ratcheted in said retracting direction by moving said handle from said first position to said second position when said pawl is in said engagement position.

12. The retractable tie-down assembly of claim 11 wherein said handle is pivotally mounted about an axis defined by said axle of said spool.

13. The retractable tie-down assembly of claim 12 wherein said frame includes a catch means for holding said handle in said first position in the presence of vibrations.

14. The retractable tie-down assembly of claim 13 wherein said locking means includes a crossbar mounted between said side walls of said frame, said crossbar being capable of engaging said ratchet wheel of said spool when in said locked position to prevent said spool from rotation in said pay out direction.

15. The retractable tie-down assembly of claim 11 and further comprising:

additional spring means engaged with said locking means and said handle operable to normally urge said locking means into locking engagement with said spool thereby limiting spool rotation in said pay out direction.

16. A retractable tie-down assembly comprising:

a frame having a pair of spaced apart side walls;

a spool rotatably mounted to said frame and having an axle and end walls at least one of said end walls being configured as a ratchet wheel, said spool being capable of rotating in a pay out direction and a retracting direction;

webbing wrapable on said spool and having one end attached to said spool;

a spring attached to said frame and said spool and normally urging said spool to rotate in said retracting direction whereat a portion of said webbing is wrapped thereon;

locking means, mounted to said frame and operable to lock said spool against rotation in said pay out direction; and manual means, including a handle movably mounted to said frame, for manually ratcheting said spool to rotate in said retracting direction, said manual means further including a pawl mounted to said handle and manually movable between an engagement position and a free position, said pawl being capable of engaging said ratchet wheel of said spool when in said engagement position but being biased to said free position.

17. A retractable tie-down assembly comprising:

a frame having a pair of spaced apart side walls;

a spool rotatably mounted to said frame and having an axle and end walls at least one of said end walls being configured as a ratchet wheel, said spool being capable of rotating in a pay out direction and a retracting direction;

webbing wrapable on said spool and having one end attached to said spool;

a first spring attached to said frame and said spool and normally urging said spool to rotate in said retracting direction whereat a portion of said webbing is wrapped thereon;

a lock movably mounted to said frame to lock said spool against rotation in said pay out direction;

a handle movably mounted to said frame for manually ratcheting said spool to rotate in said retracting direction, said handle including a pawl manually movable between an engagement position and a free position; and, a second spring connected to said handle to bias said pawl to said free position.

* * * * *

UNITED STATES PATENT AND TRADEMARK OFFICE
CERTIFICATE OF CORRECTION

PATENT NO. : 5,282,706
DATED      : February 1, 1994
INVENTOR(S): James T. Anthony and Niels Dybro It is certified that error appears in the above-identified patent and that said Letters Patent is hereby corrected as shown below:

Column 8, line 7, delete the word "is" and insert --in--

Signed and Sealed this

Fourteenth Day of June, 1994

Attest:

BRUCE LEHMAN

*Attesting Officer*    *Commissioner of Patents and Trademarks*